(Model.) 3 Sheets—Sheet 1.
O. C. WHITNEY.
REED ORGAN STOP ACTION.
No. 297,211. Patented Apr. 22, 1884.
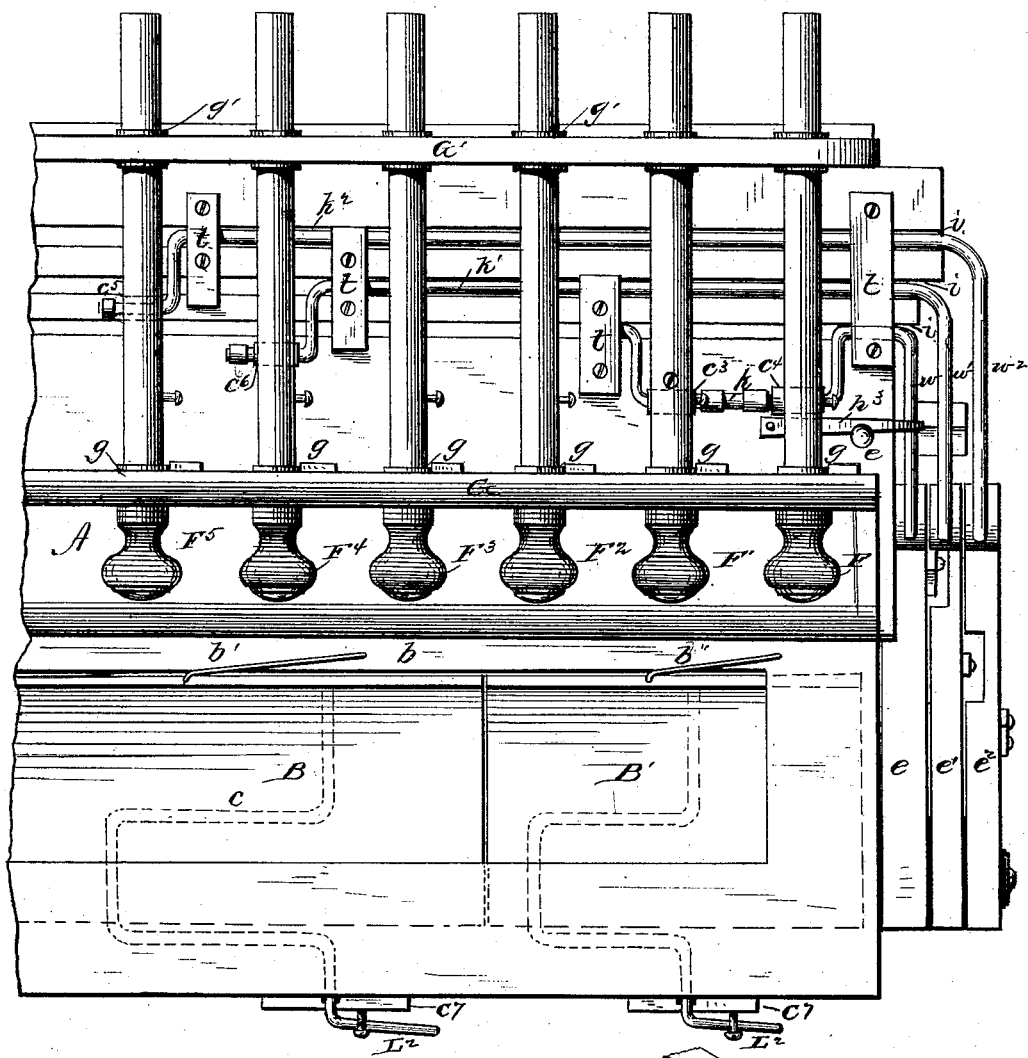
WITNESSES
Franck L. Ourand
Frank A. Fouts
INVENTOR
Orison C. Whitney,
By Geo. W. Tibbetts,
Attorney (Model.)  3 Sheets—Sheet 2.
O. C. WHITNEY.
REED ORGAN STOP ACTION.
No. 297,211.  Patented Apr. 22, 1884.
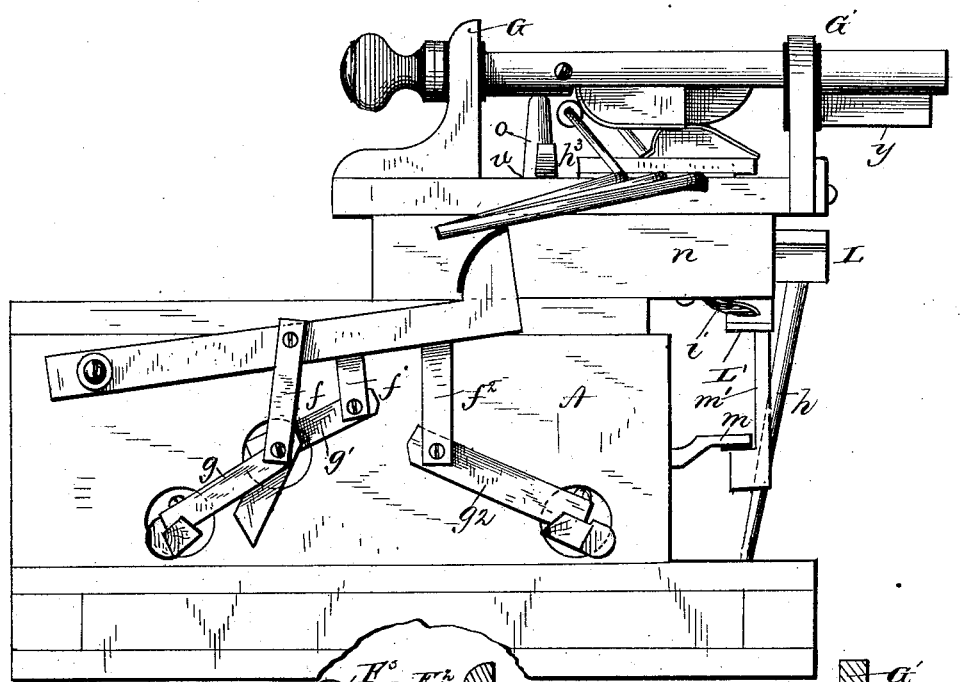
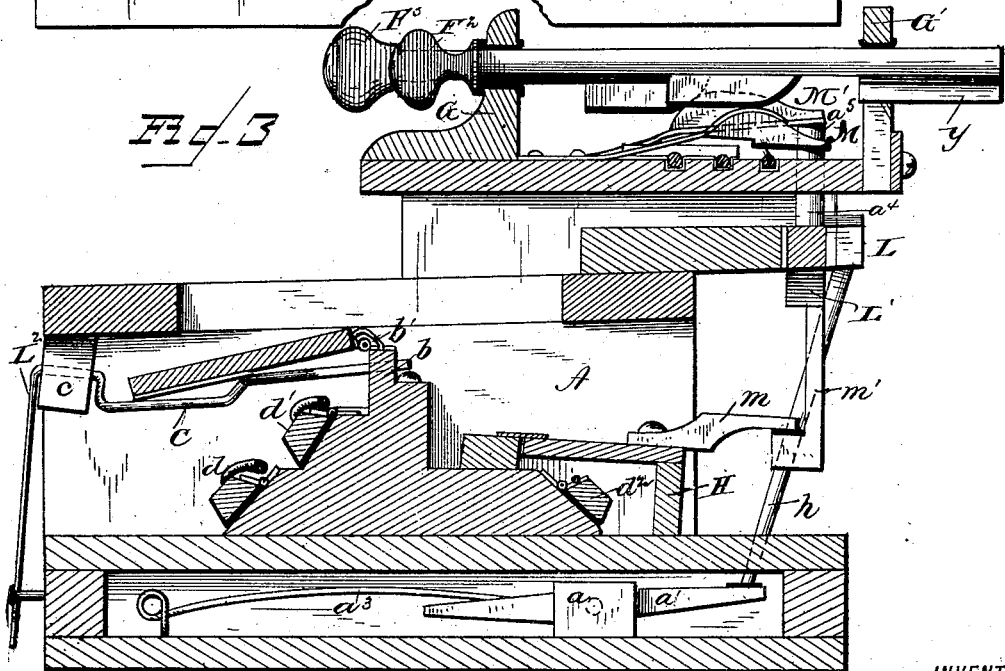
WITNESSES
Franck L. Ourand
Frank A. Fouts
INVENTOR
Orison C. Whitney
By Geo W. Tibbetts.
Attorney (Model.)

O. C. WHITNEY.
REED ORGAN STOP ACTION.

No. 297,211.  Patented Apr. 22, 1884.

WITNESSES
F. L. Ourand
F. A. Fouts

INVENTOR
Orison C. Whitney
By Geo. W. Tibbetts
Attorney.

UNITED STATES PATENT OFFICE.

ORISON C. WHITNEY, OF CLEVELAND, OHIO.

REED-ORGAN STOP-ACTION.

SPECIFICATION forming part of Letters Patent No. 297,211, dated April 22, 1884.

Application filed July 24, 1882. (Model.)

*To all whom it may concern:*

Be it known that I, ORISON C. WHITNEY, of Cleveland, in the county of Cuyahoga and State of Ohio, have invented certain new and useful Improvements in Stop Mechanism for Cabinet-Organs, of which the following is a specification.

This invention has relation to stop mechanism for cabinet-organs; and it consists in the construction and arrangement of parts, as will be hereinafter described, and particularly pointed out in the claims.

Figure 4:
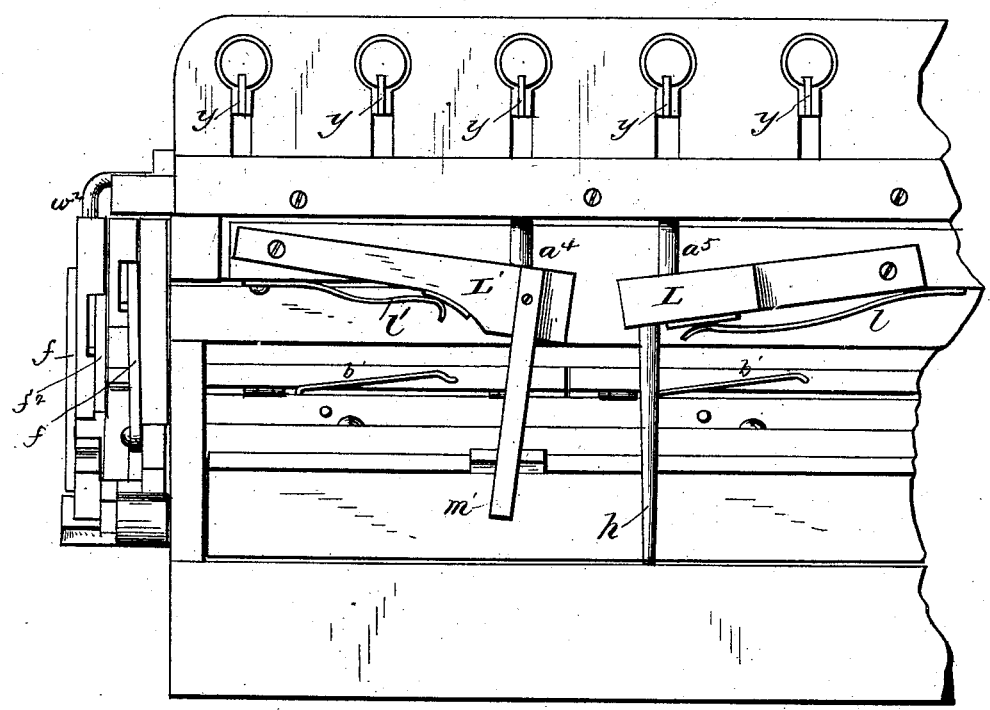
Figure 5:
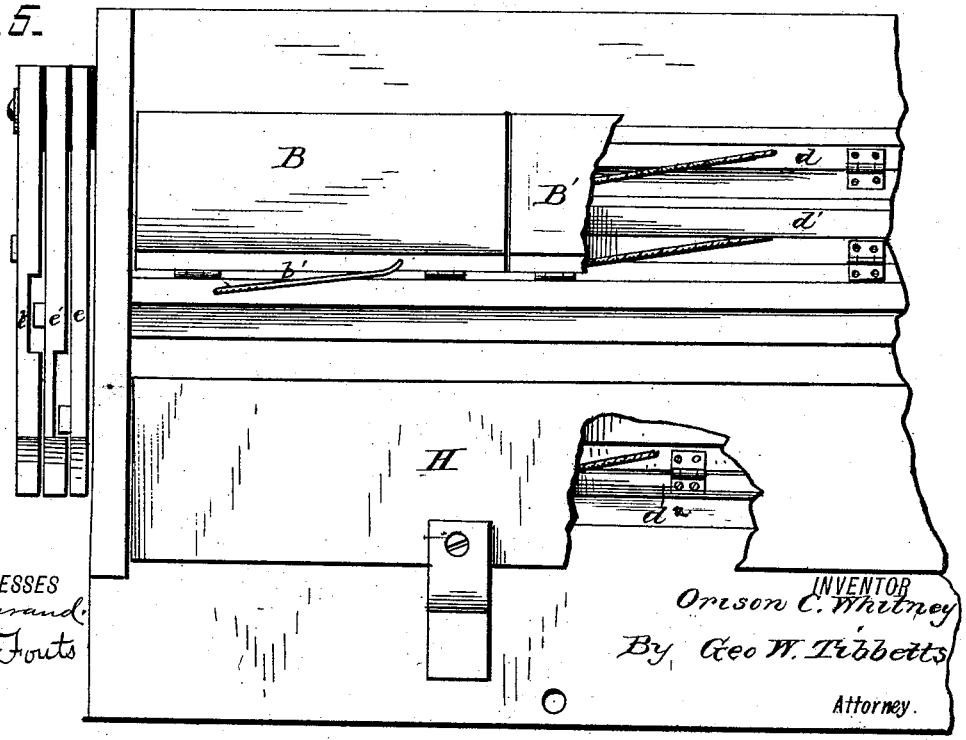

In the accompanying drawings, Figure 1 is a plan view of my invention. Fig. 2 is a side view thereof. Fig. 3 is a transverse section. Fig. 4 is a rear view. Fig. 5 is a plan view of the swell and couplers, and Fig. 6 is a detail view of the stops for operating the rear valve.

The letter A represents the frame of my invention, having at the bottom portion thereof an upright, $a$, to which is pivoted the tremolo-valve lever $a'$, operated by a spring, $a^3$. To or near the front portion of this frame and hinged to a strip, $b$, are the bass and treble couplers B B', having springs $b'$ at their rear portions, secured to the strip $b$, as shown in Fig. 1. These couplers are operated by bent wires $c$, having bearings at their inner ends in the strip $b$. The front ends of these wires are bent vertically, and have their outer portions bearing in the block $c^7$, attached to the front of the frame. The front or vertical ends, $1^2$, of these wires are designed to be used as knee-levers for operating the bass and treble couplers aforesaid.

The letters $d$, $d'$, and $d^2$ are the mutes or spring-valves, which extend longitudinally across the frame and project out through openings at one side thereof. The two former of these valves are near the middle of the frame, while the latter is at the rear. To one side of this frame are pivoted the levers $e$, $e'$, and $e^2$, having links $f$, $f'$, and $f^2$, which are in turn pivoted to cranks $g$, $g'$, and $g^2$, said cranks being secured to the projecting ends of the valves, respectively. A pin, $h$, passes through a perforation in the rear lower part of the frame A, and is connected at its lower end with the tremolo, while its upper end connects with a lever, L, pivoted to the rear of the frame and provided with a spring, $l$.

H represents the swell, which is flexibly secured to the frame, and it is provided with an arm, $m$, which connects with an arm, $m'$, secured to the lever L', which is also pivoted to the rear of the frame, the same as the lever L, and is provided with a similar spring, $l'$. The top of the frame A is provided with blocks $n$ at each end, having vertical pins $o$ $o$, which are slitted near their lower extremities, as shown, for a purpose hereinafter described.

The letter C denotes the upper frame, which is designed to rest on the lower frame, A; and for this reason it is provided with openings $u$, which are adapted to be passed over the pins and rest on the support $n$, whereby the two frames are secured together by means of spring-catches $h^3$, pivoted to the upper frame and sprung into the slits of the pins, thus rendering the upper frame removable, for the purpose of cleaning and repairing. The frame C is provided with longitudinal grooves $i$, in which are arranged wire rods $k$, $k'$, and $k^2$, held in place by blocks $t$, their outer ends bent to form crank-arms $w$, $w'$, and $w^2$, which rest loosely upon the heads of the levers $e$, $e'$, and $e^2$, respectively. The rod $k$ is made in bail form, and is provided with friction-rollers $c^3$ $c^4$, for a purpose hereinafter described. The inner ends of the rods $k'$ and $k^2$ are correspondingly provided with friction-rollers $c^5$ and $c^6$. At about the middle portion of this upper frame are secured spring-heads M and M', having at their under sides pins $a^4$ and $a^5$, which pass through perforations in said upper board and rest upon the tops of the spring-levers L L'. On the upper frame, at its front and rear portions, are the uprights G G', the former having perforations $g$ and the latter having openings $g'$ in the form of a key-hole.

The letters F F' F² F³ F⁴ F⁵ denote the stop-rods which engage the openings of the front and rear uprights, and have their movements therein, and these stop-rods are provided with extensions $y$, in key form, to prevent turning in the openings of the uprights. They are also provided near their under middle portions with blocks $q$, having semicircular inner ends, $q'$. The block of the stop-rod F' is about half the size of the other blocks of the rods, for a purpose hereinafter described.

The two stops F² and F³, at the middle of the frame C, operate the swell and tremolo, through the medium of the pins $a^4$ and $a^5$, resting on the levers L and L′, whereby when said stops are drawn out the pins are released from pressure, and they are thrown upward by the springs of the levers L and L′.

The two stops $F^4$ and $F^5$ operate the mutes $d$ and $d'$ independently when they are drawn out over the rollers $c^5$ and $c^6$ of the rods $k'$ and $k^2$.

The stop F′, having the smallest block, is for operating the spring-valve $d^2$, whereby when said rod is pulled out it rides over the roller $c^3$ of the bail-rod $k$, and partially opens the valve $d^2$; but when the stop-rod F is pulled out over the roller $c^4$, the said valve is thrown entirely open.

I am aware that it is not new to operate the same stop-valve in different ways by different stop-draws, and I do not claim such devices, broadly.

Having described my invention, what I claim is—

1. The combination, with the frame A, having the pivoted lever $e$, of the frame C, having the rod $k$, secured in a groove in said frame, and provided with an arm, $w$, resting loosely on said lever, said rod made in bail form and having rollers $c^3$ $c^4$, and the uprights G G′ on frame C, in which play the stop-rods F F′, provided with blocks $q$ of different sizes, whereby the mute $d^2$ is partially or entirely opened alternately by said stops, as shown and described.

2. The combination, with the frame A, having the vertical pins $o$, provided with grooves or slits, of the frame C, having perforations to engage said pins, and provided with upwardly-turned spring-catches $h^3$, adapted to be sprung into the grooves or slits of the pins to secure the two frames together, as shown and described, and for the purpose set forth.

3. The combination, with the frame C, having the spring-heads M M′, provided with pins $a^4$ $a^5$, of the frame A, having the levers L L′, engaging said pins, the former provided with the pin $h$, connected to the tremolo, and the latter provided with an arm, $m'$, attached to an arm, $m$, of the swell, and the stop-rods $F^2$ $F^3$, adapted to engage the spring-heads to operate the said tremolo and swell, as shown and described.

4. The combination, with the frame A, having the levers $e$ $e'$ $e^2$, pivoted to one side thereof, and provided with links $f$ $f'$ $f^2$, and arm $g$ $g'$ $g^2$, connected to the links and to the mutes $d$ $d'$ $d^2$, of the frame C, having uprights G G′, provided with openings $g$ $g'$ for the stop-rods F F′ $F^4$ $F^5$, having blocks, the rods $k$ $k'$ $k^2$, provided with rollers $c^3$ $c^4$ $c^5$ $c^6$, and the arms $w$ $w'$ $w^2$, resting on said levers, said stops $F^4$ $F^5$ independently operating the mutes $d$ $d'$, and the stops F F′ operating the bail-rod $k$, whereby the valve $d$ is partially or entirely thrown open, as set forth.

5. The pins $a^4$ and $a^5$, secured to the spring-heads M and M′ on the frame C, in combination with the swell and tremolo-valve lever and the draw-stops $F^2$ $F^3$, as shown and described.

ORISON C. WHITNEY.

Witnesses:
GEO. W. TIBBITTS,
E. W. LAIRD.